United States Patent

Aust et al.

Patent Number: 5,860,059
Date of Patent: Jan. 12, 1999

[54] TRANSACTION SYSTEM BASED ON A BIDIRECTIONAL SPEECH CHANNEL BY STATUS GRAPH BUILDING AND PROBLEM DETECTION FOR A HUMAN USER

[75] Inventors: Harald Aust; Holger W. Bröde; Olaf Schröer; Jens F. Marschner; Erique Marti Del Olmo, all of Aachen; Ralf Mehlan, Huntington, all of Germany

[73] Assignee: U.S. Philips Corporation, New York, N.Y.

[21] Appl. No.: 810,778

[22] Filed: Mar. 5, 1997

[30] Foreign Application Priority Data

Mar. 5, 1996 [EP] European Pat. Off. ............ 962000582
Jun. 20, 1996 [EP] European Pat. Off. ............ 96201717

[51] Int. Cl.$^6$ ............................. G10L 3/02; G10L 9/00; G10L 5/02
[52] U.S. Cl. .............................. 704/231; 704/275
[58] Field of Search ..................... 704/231, 275

[56] References Cited

U.S. PATENT DOCUMENTS

5,410,704  4/1995  Norden-Paul ........................ 395/700

Primary Examiner—David R. Hudspeth
Assistant Examiner—Robert Louis Sax

[57] ABSTRACT

A transaction system has machine recognition of speech. It has dialogue control fed by the recognition, and speech generation fed by the dialogue control for outputting question and verifier statements from a repertoire set. A human-machine dialogue is executed until the dialogue control has recognized a viable transaction formulation with a plurality of user-provided slot fillers to specify the transaction. Dialogue control builds a directed and loopless status graph with nodes that each have their own slot filler and associated metric, and are interrelated through logic relations. The building can amend a node's metric and under control of conflict detection or lowering of a particular node's metric, discard the node in question and its filler, including of derived nodes and also of one-to-one derival nodes of the discarded node. A subset of problems is detected for a particular item outputted by the speech generation for ascertaining a particular slot filler, as combined with a subsequent unsatisfactory recognition. Then the speech generation outputs a further question statement for ascertaining the latter slot filler.

14 Claims, 8 Drawing Sheets

From where to where do you want to travel?
*Today from Aachen.*

FIG. 2A

Where to do you want to travel to day from Aachen?
*To Bonn.*

FIG. 2B

At what time do you want to travel from Aachen to Bonn?
*At 20.00 hours.*

FIG. 2C

From where to where......?
*Today at seven.*

FIG. 2D

From where to where.....to day at 19:00 hours?
*At ten o'clock.*

FIG. 2E

From where to where.....?
*At seven, at seven....at ten.*

FIG. 2F

From where to where....at seven?
*Not at seven.*

FIG. 2G

From where to where.....at ten?
*To Bonn.....to Berlin.*

FIG. 2H

To Berlin?
*No.*

FIG. 2I

From where to where......?
*Today...tomorrow...at seven...at nine.*

FIG. 2J

From where to where do you want the travel tomorrow?
*Today.*

FIG. 2K

....today at 21:00 hours?
*At eleven.*

FIG. 2L

From where to where....at 23:00 hours?
*Not at 23:00 hours.*

FIG. 2M

...today at eleven...?
*Not at eleven from Aachen.*

...today at 19:00 from Aachen.

FIG. 2N

From where to where...?
*Today.*

FIG. 20

From where to where....today?
*Between nine en eleven.*

...today between 21:00 and 23:00 hours?

FIG. 2P

Case 1

FIG. 3A

Case 2

FIG. 3B

Case 3

FIG. 3C

Case 4

FIG. 3D 5,860,059

TRANSACTION SYSTEM BASED ON A BIDIRECTIONAL SPEECH CHANNEL BY STATUS GRAPH BUILDING AND PROBLEM DETECTION FOR A HUMAN USER

BACKGROUND OF THE INVENTION

The invention relates to a transaction system based on machine-based speech recognition, comprising a speech input, speech recognition means fed by said speech input, dialogue control means fed by said speech recognition means, and speech generation means fed by said dialogue control means for outputting question statements and verifier statements from a statement repertoire set, and for executing a human-machine dialogue with said system, until said dialogue control means has recognized a viable transaction formulation comprising a plurality of user-provided slot fillers for specifying said transaction. By way of example, the transaction may relate to a financial transaction, to an enquiry system such as pertaining to a trains timetable or a telephone directory, or to a ticket or other commodity ordering service. Depending on the envisaged reliability level, the correspondence between what the user person wishes to convey, and the understanding thereof by the machine, must concord to certain often high levels of confidence. First, the message comprises so-called slot filler items, that may represent numbers, locations, prices, clock times, dates, and various other, depending on the field of application, and which items represent the backbone of the message. The slot filler items must be recognized, both as to their content, and as to their context. Sometimes, the message may have more than one slot filler item for the same slot. The statements may be built from smaller units of speech such as words, so that the statements are stored indirectly, as it were.

As the case may be, the message may contain qualifiers, such as 'not', 'or', that can have a distinct influence on the meaning of associated slot filler items, and therefore, must be recognized as well. Finally, the user speech can comprise general items that have no relevance for the content of the message, but which may not be confused with the two earlier categories. Often, the user person cannot provide the message in the form of a single sentence; the message must then be extracted from the user in bits and pieces. Also, various problems can occur in the dialogue that must by necessity ensue.

SUMMARY OF THE INVENTION

In consequence, amongst other things, it is an object of the present invention to straighten out the above identified dialogue through structuring the results thereof, and as a consequence to allow to diminish the number and to raise the effectivity of the necessary questions and other statements by the machine, by forming combinations of various available results. Now, according to one of its aspects, the invention is characterized in that said dialogue control means comprise with respect to a particular transaction:

status graph building means for building one ore more directed and loopless status graphs, with nodes that each comprise a respective one of said slot fillers and an associated verifier metric, and which nodes are interrelated through logic combinations among their respective slot fillers, and said graph building means including amending means for amending a node's metric and discard means for under control of conflict detection or lowering of a particular node's metric, discarding the node in question, including of all nodes derived from the discarded node, and also one-to-one derival nodes of the discarded node, problem detector means for detecting a particular subset of problems associated with a particular statement outputted by said speech generation means regarding a particular slot filler item, as combined with an associated subsequent human speech unsatisfactory recognition result, and thereupon controlling said speech generation means for outputting a subsequent question statement for ascertaining the latter slot filler.

In the above, a derival node of a particular node is a node from which the particular node was directly or indirectly derived.

An earlier proposal has provided for unobtrusive intervention by a human operator when dialogue progress had been going too slowly, cf. EP-A-752.129, corresponding U.S. application Ser. No. 08/587,190 (PHN 15167, Aust et al) to the assignee of the present application and herein incorporated by reference. However, the present invention allows for a completely automatic system. In particular, the building of one or more graphs, in combination with the structured discarding of certain nodes was found to offer a clear structuring for the ensuing dialogue.

Advantageously, said subsequent question statement is of simplified structure as compared to said particular predecessor statement. Especially, in case user persons feel confused with the machine procedure, the formulating of relatively simple statements was found to offer a possibility for further progress in the dialogue.

Advantageously, said discarding pertains also to all identical many-to-one derival nodes but excludes non-identical many-to-one derival nodes of any discarded node. This feature provides a fully justifiable discarding of nodes in the graph that are no longer considered relevant. Further advantageous aspects of the invention are recited in dependent claims.

Advantageously, each recognized slot filler item is verified once by a directly subsequent verifier statement. It has been found that such verification is well-defined, and not too much time-consuming. The invention also relates to a method for implementing a human-machine transaction according to the principles discussed above. Further advantageous aspects of the invention are recited in further dependent claims.

BRIEF DESCRIPTION OF THE DRAWING

These and other aspects and advantages of the invention will be discussed more in detail with reference to the disclosure of preferred embodiments hereinafter, and in particular with reference to the appended Figures that show.

Subsequently, the two Table pages comprise various items featured in the dialogue.

DETAILED DESCRIPTION OF PREFERRED EMBODIMENTS

Figure 1:
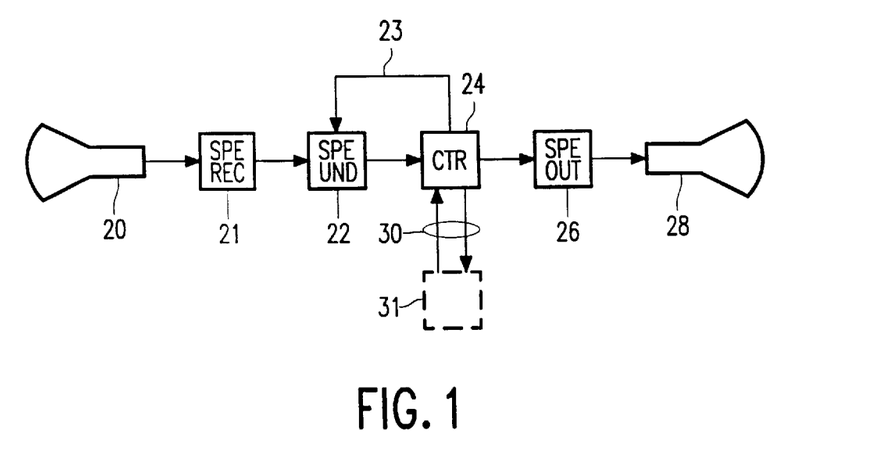
FIG. 1, a block diagram of an overall system according to the invention.

FIG. 1 is a block diagram of an overall system according to the present invention. Block 20 represents a microphone, block 21 a speech recognition subsystem, and block 22 a speech understanding subsystem. Of these, the first one undertakes to recognize a sequence of words. The second one tries to find the words that may be used to fill message slots, and also further words that are relevant in the dialogue, under control (23) of further information received from dialogue control block 24. The output of block 22 is therefore a sequence of slot filler items, such as names and values, that are to be taken into account for the dialogue. These words are received in dialogue control block 24 that may communicate with a background system 31 via bidirectional interface 30. The background system may contain the overall database that the user wants to interrogate, or in the case of transactions regarding goods or services, the authority that provides for and subsequently executes these transactions. Block 26 is a speech generation system feeding a loudspeaker 28. Through interfacing to elements 20, 28, a human person can experience a bidirectional speech channel; alternatively, these elements may be remote from the remainder of the system, but connected thereto by telephone or the like. Apart from block 24, all elements in the Figure may be conventional, and can be derived from standard speech processing textbooks. The request to the host can be formulated as a message that has all slots filled with appropriate informations. In practice, the message is formatted and shortened through omitting all non-significant items therein. The further operation of the dialogue control subsystem will be considered with reference to FIGS. 2A–2P.

Figure 2A:
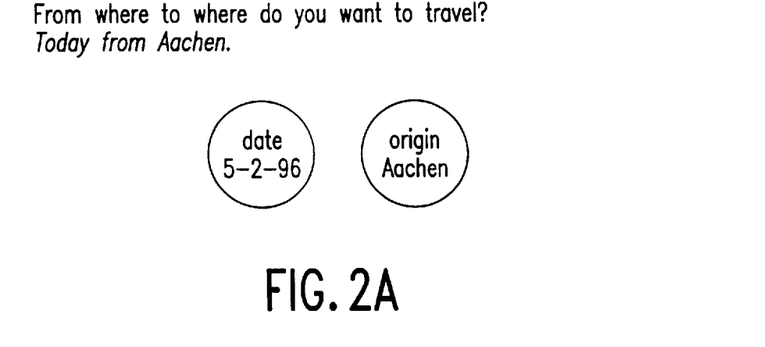
FIGS. 2A–2P, the constructing of status graphs.
Figure 2B:
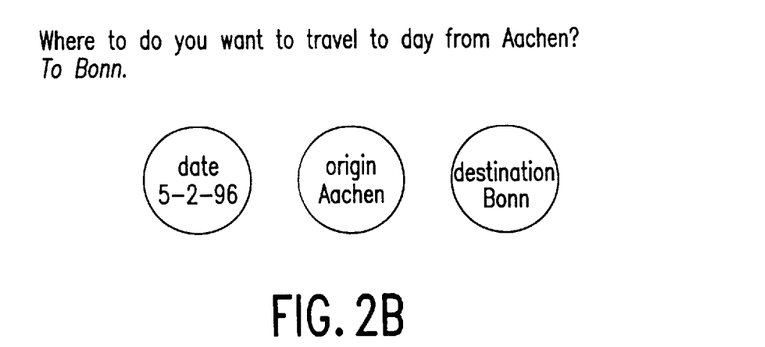
Figure 2C:
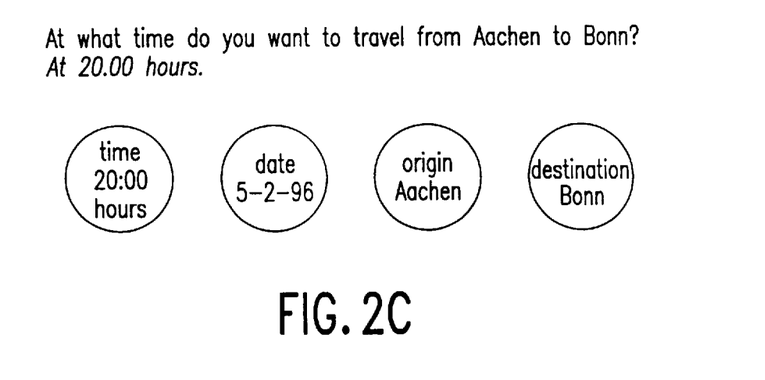

FIGS. 2A–2P show several examples of constructing a status graph for use in the invention. The present embodiment relates to a trains timetable enquiry system. After dial-in by the user, and an introductory statement not shown, by the machine, the first question statement by the machine (FIG. 2A) is "from where, and to where do you want to travel". The user person answers (not fully correctly): "I want to travel today from Aachen (a city in Germany)". This allows (when recognized correctly) the machine to fill the origin slot and the date slot (Feb. 5, 1996). For confirmation, and also for gathering further information, the machine then asks: "whereto do you want to travel today form Aachen?" (FIG. 2B) The user then answers "To Bonn (another city in Germany)". This allows the machine to confirm or verify the origin and date slots, and to fill the destination slot. For confirmation of the destination slot, and also for gathering further information, the machine then asks: "At what time do you want to travel to Bonn"? The day and origin had been ascertained sufficiently now (FIG. 2C). The user person now answers: "At 20.00 hours". Now, only the time has to be ascertained, and this is done by directly proposing the train that has its departure time closest 20.00 hours, in view of the fact that the dialogue has proceeded error-less: "We propose the train of 20.08 hours (say) from Aachen to Bonn. Does that suit you?" It is assumed that the user confirms, and subsequently, the machine takes leave from the user. In this case, all four nodes found are logically unrelated, and therefore, each node represents an individual status graph.

Figure 2D:
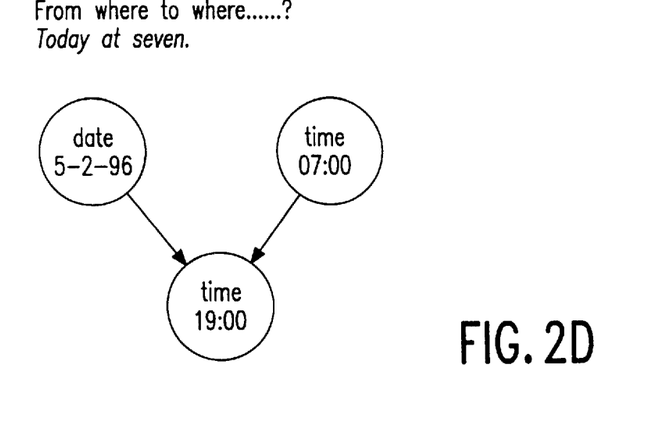
Figure 2E:
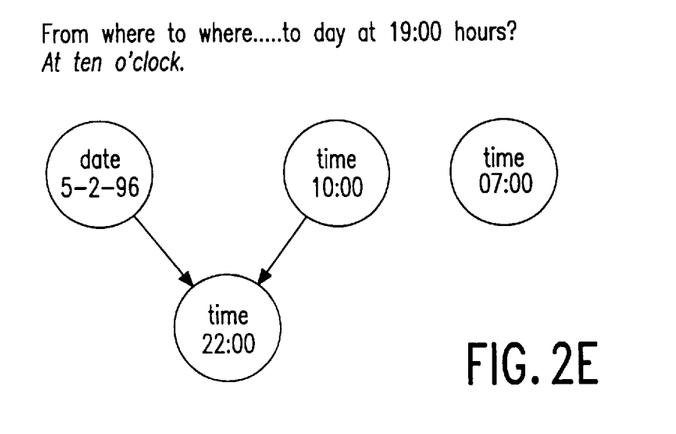

Hereinafter, a few examples of more problematic outcomes in the dialogue is discussed. FIG. 2D again starts with the question of FIG. 2A, but now the user answers "Today at seven hours". This fills the date slot, but the time slot is still open to doubt between 07.00 and 19.00 hours. In view of the fact that actual time of today is between 7.00 and 19.00 hours, the machine infers that the user actually means 19.00 hours. The status graph is as shown in FIG. 2D: the nodes 'date' and '19.00 hours' are connected, but the earlier time is retained as a separate though connected node. In FIG. 2E, the machine asks for information and confirmation: "From where to where do you want to travel at 19.00 hours?" (FIG. 2E). To this, the user answers unexpectedly: "At ten o'clock". This confirms nothing, but leads to discarding the clock time of 19.00 hours, because it conflicts with the newly received answer. Moreover, the answer puts two new clock times in two respective status graph nodes, while maintaining the first time entry '7.00 hours' in a sequestered node; this was caused by the non-identity between 19.00 hours and 7.00 hours.

Figure 2F:
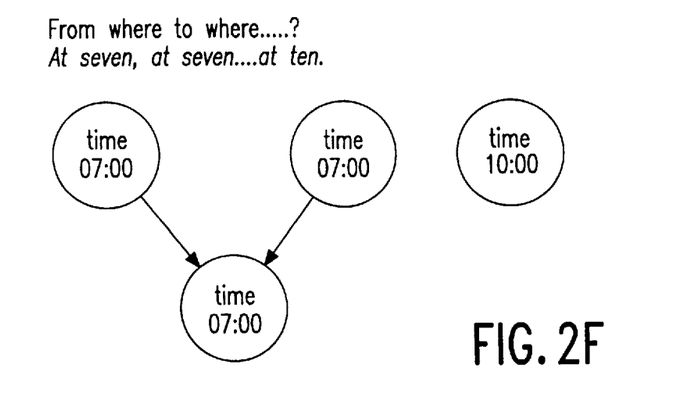
Figure 2G:
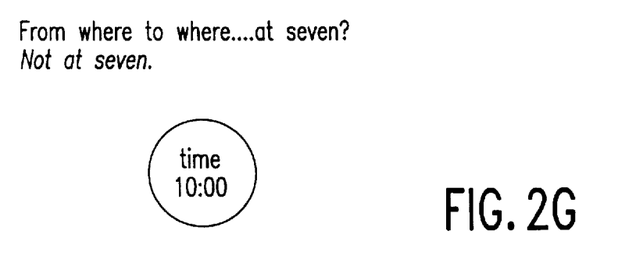
Figure 2H:
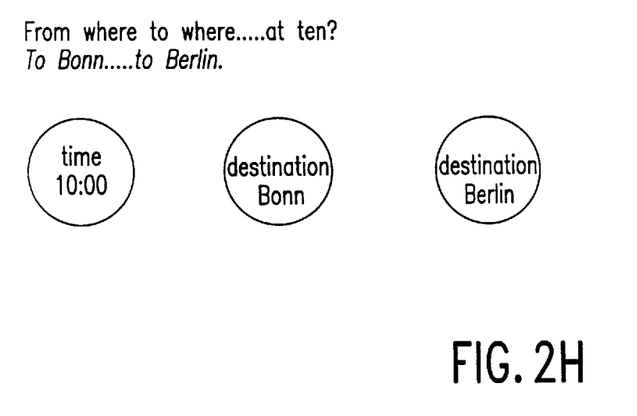

FIG. 2F relates to a further dialogue, starting with the standard question: "From where to where do you want to travel?" The user person is obviously uncertain, and answers "At seven, at seven, . . . at ten o'clock". The machine recognizes two identical slot fillers, and by way of majority voting combines two nodes 7.00 hours to a single one as being the most probable departure time, while retaining 10.00 hours as a sequestered node. At this point, the machine undertakes to get further information on origin and destination, and to get the departure time confirmed: "From where to where do you want to travel at seven o'clock?" (FIG. 2G) Unexpectedly the user person answers with a particular qualifier: "Not at seven". This discards the combination node, and also the two identical derival nodes of FIG. 2F and leaves as only remaining node: 10.00 hours.

Figure 2I:
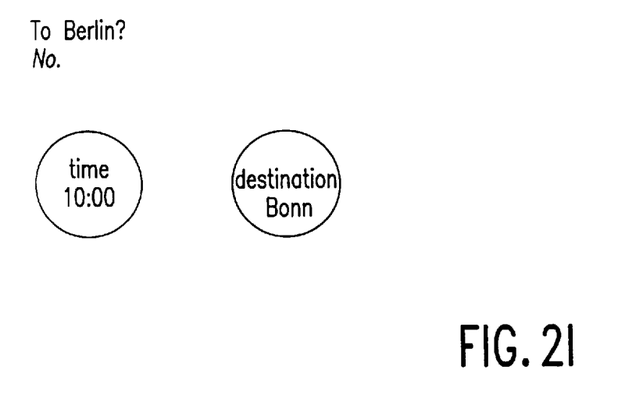

Thereupon, the machine again undertakes to find origin and destination: "From where to where do you want to travel at ten o'clock?", still leaving out the day as implicit. To this, the user person answers ambiguously: "to Bonn . . . to Berlin", that in consequence, each get an associated node. The machine again senses a problem and asks a simplified question, taking the last entry in time as representing the most probable destination: "Wherefrom do you want to travel to Berlin?" (FIG. 2I). To this, the user answers "No", which discards destination Berlin, retaining only two slot filler nodes.

Figure 2J:
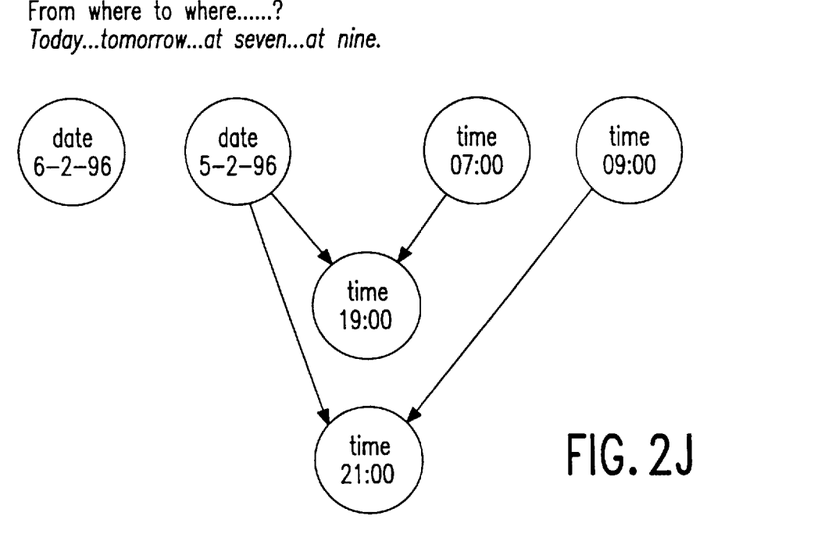
Figure 2K:
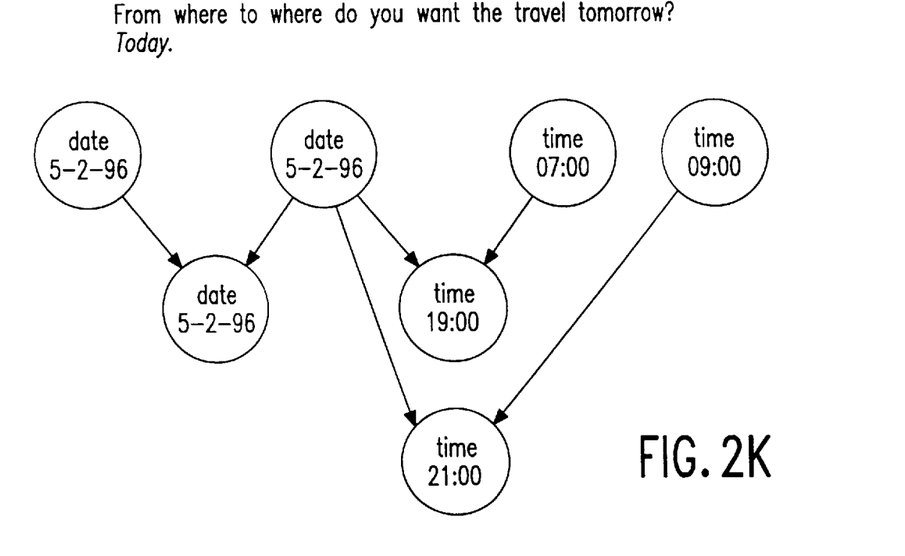
Figure 2L:
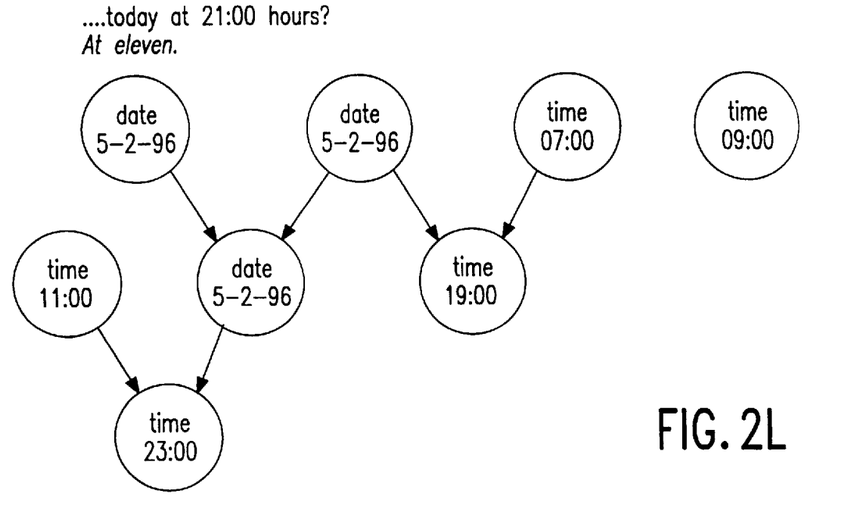
Figure 2M:
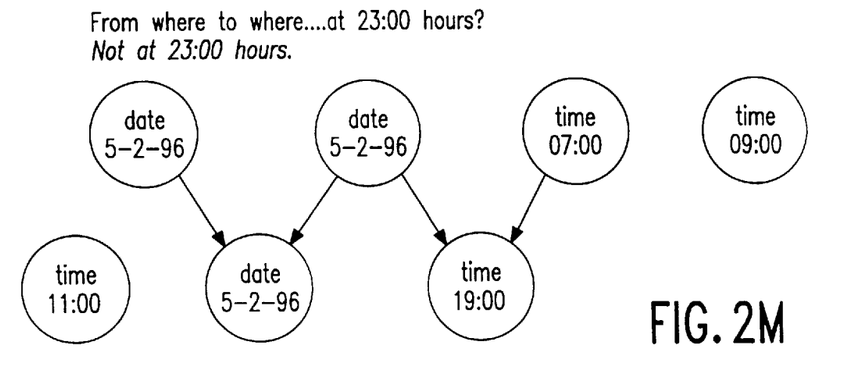
Figure 2N:
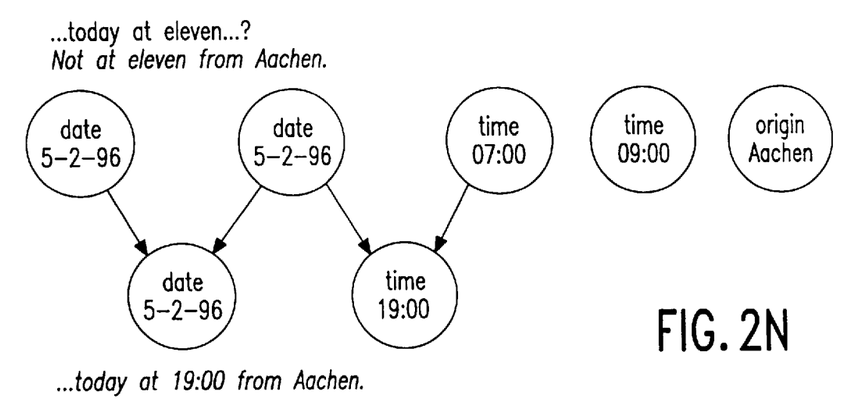

FIG. 2J starts a new dialogue with the standard question: "From where to where do you want to travel?" To this, the user again answers ambiguously: "Today . . . tomorrow . . . at seven o'clock . . . at nine o'clock". The status graph now gets a sequestered node of Feb. 6, 1996 (tomorrow), and in addition to the node of "today", has four time nodes interconnected as shown. The configuration arises in correspondence with FIG. 2E, because actual time is between 9.00 hours and 17.00 hours. For confirmation, the machine then asks "From where to where do you want to travel today?" (FIG. 2K) The user person answers only "Today", which discards the node of "tomorrow", and adds an extra slot filler node of "today", thereby confirming the "today" information, and keeping the time nodes as they were in the previous Figure. To confirm, the machine then asks, starting from the latest applicable time: "From where to where do you want to travel at 21.00 hours?" (FIG. 2L) To this the user person answers, unexpectedly: "at eleven". This produces a pair of new nodes that are interconnected to the date node, and discards the node 21.00 hours, while keeping the node 9.00 hours sequestered. All other nodes remain as they were. The reason is that the node 21.00 hours differs from all derival nodes connected thereto.

Now, the machine again undertakes to find the requested route: "From where to where do you want to travel today at 23.00 hours?" (FIG. 2M) To this, the user answers "Not at 23.00 hours", which discards the 23.00 hours node but retains all other nodes. The machine senses a problem and poses a simplified question: "Today at eleven?" (FIG. 2N) To this, the user person answers "Not at eleven from Aachen". This discards the 11.00 hours node, and introduces a new origin node: Aachen, because the qualifier word 'from' had been recognized. Now the machine asks "Whereto do you want to travel today at 19.00 hours from Aachen?" Here, the reporting on this as yet unsuccessful dialogue terminates.

Figure 2O:
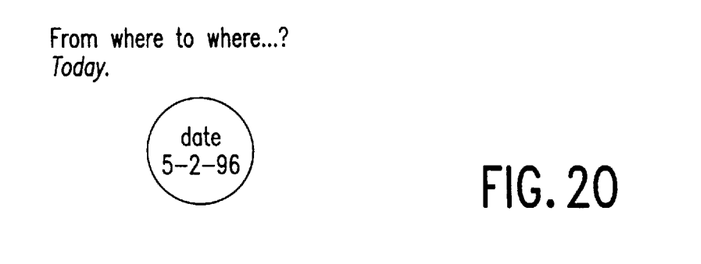
Figure 2P:
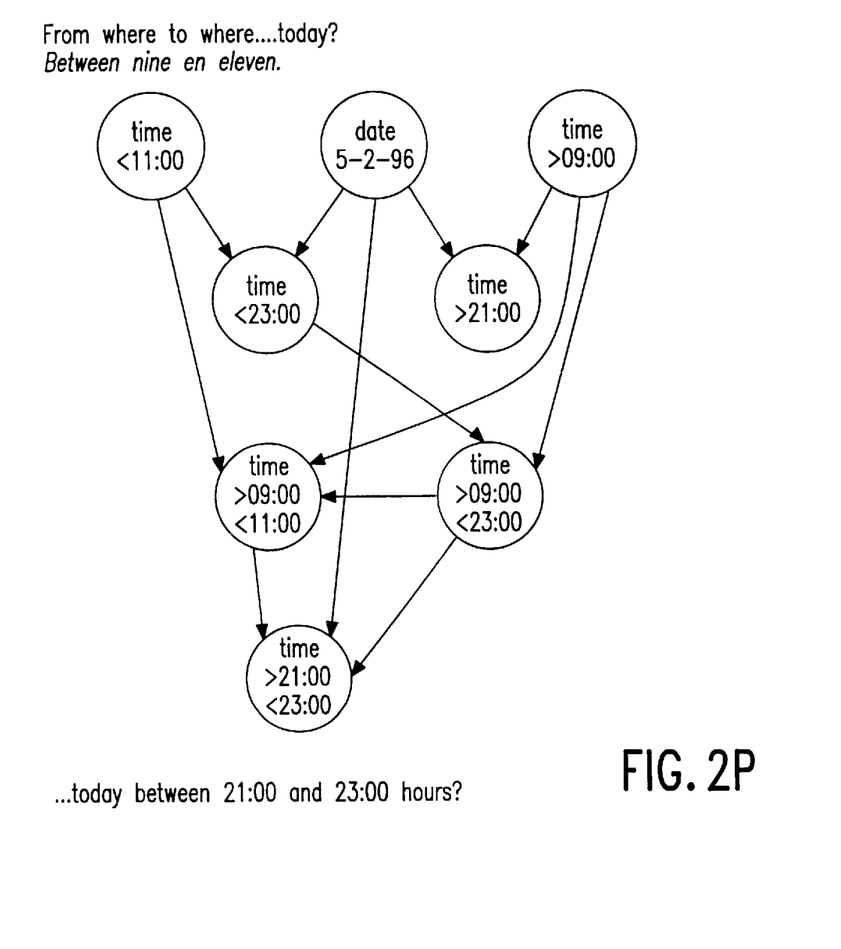

FIG. 2O relates to a new dialogue that starts in the same way as the earlier ones. Now, the user answers "Today", which fixes a first node. The next question then is (FIG. 2P): From where to where do you want to travel today, to which the user answers: "Between nine and eleven". This allows the system to set up a status graph that has four single-side time limiting nodes, a date node, and three double-sided limiting nodes. The next question intends to verify the time limits and asks: "Between 21.00 and 23.00 hours?" these being the two latest times that produce a feasible interval. Of course, in view of the actual time lying in any of the respective intervals between these various times, the graph could be structured as discussed earlier. The further progress of this exemplary dialogue has not been reproduced.

FIG. 3 shows four elementary discarding models. This means that after setting up a particular status graph node, this is later on discarded, because its content is inconsistent with an answer that was received subsequently from the user. The Figures show the further effects on the other nodes of the status graph. The arrows indicate the direction of the deriving. According to FIG. 3A, node (a) at left is one-to-one derived from node (b). Therefore, discarding of node (a) immediately implies discarding of node (b). According to FIG. 3B, node (b) at left is one-to-one derived from node (a). Therefore, discarding of node (a) immediately implies discarding of node (b). According to FIG. 3C, node (a) at left is derived from two identical nodes (a) at right. Therefore, discarding of node (a) at left immediately implies discarding of both derival nodes (a) at right. According to FIG. 3D, node (a) at left is derived from two different nodes (b, c) at right. Therefore, discarding of node (a) at left does not influence any derival nodes (b, c) at right. Generally, only identical (a) derival nodes at right would be influenced.

Figure 4:
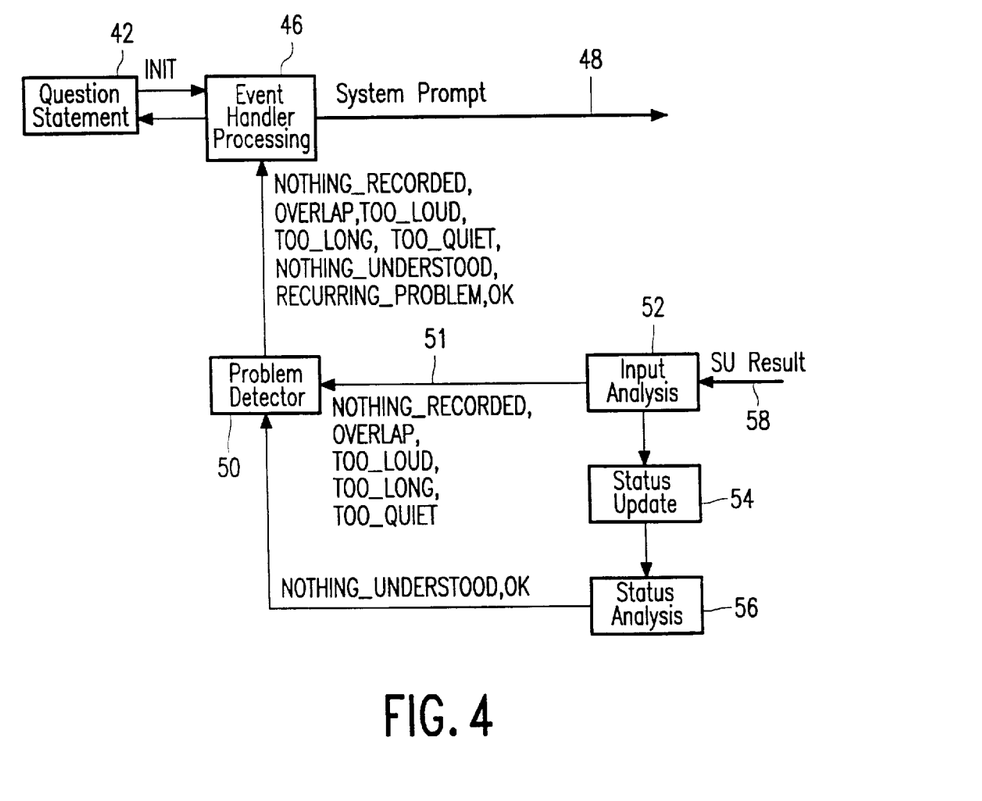
FIG. 4, a problem detector diagram.

FIG. 4 shows a diagram of the problem detector and its organizational environment, generally on the basis of a question produced earlier by the system by means of block 44. First, the subsequent answer is received and processed in the speech recognition of FIG. 1, and the result on line 58 is forwarded to the dialogue control system (FIG. 1, item 24). In block 52 the recognition result is analyzed. First, the sound quality may be insufficient for further processing; this information is sent to block 50. In particular, the results may be as follows:

NOTHING_RECORDED: The user person did not say anything.

OVERLAP: The utterance by the user person did overlap with the (preceding) system output.

TOO_LONG: The user's utterance could not be handled in full because of out-size length.

TOO_Quiet: The user did not say anything that could be usefully processed.

TOO_LOUD: The user person spoke too loud.

In all of these five situations occurring, the dialogue control sub-system directly switches over to the problem detector block 50, if an appropriate handler for the problem in question exists. If not, the decision is effected on available information.

Alternatively, the speech received from the user person could be considered adequate. Thereupon, the system goes to block 54, where the status of the slot fillers and their associated metric quantities is ascertained. Subsequently, in block 56 the status is analyzed. Generally, this will end up in an OK situation. In some situations however, it is absolutely necessary for the system to receive a particular specific information, because otherwise further processing would not be possible. If this particular information could however not be extracted from the speech received from the user, a NOTHING_UNDERSTOOD situation occurs. Both the latter signalizations go to problem detector 50, along with the informations received directly from block 52.

Figure 3A:
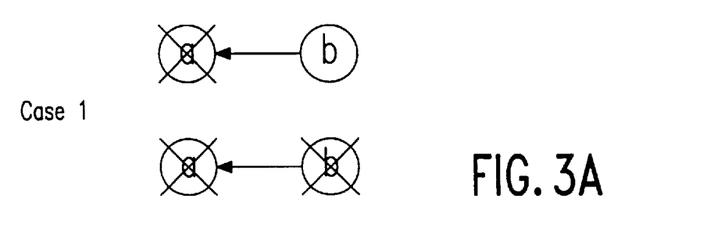
FIGS. 3A–3D, four elementary discarding models.
Figure 3B:
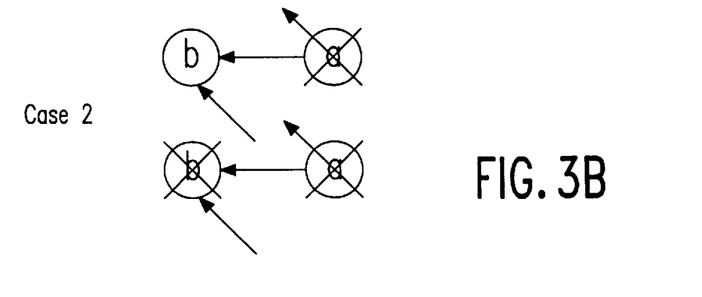
Figure 3C:
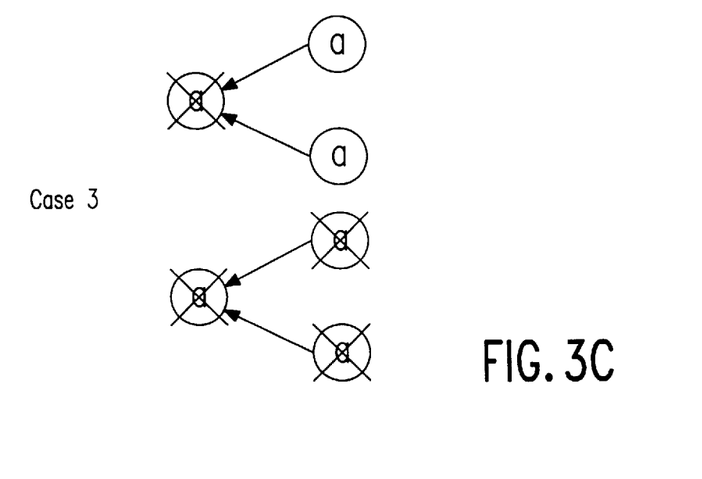
Figure 3D:
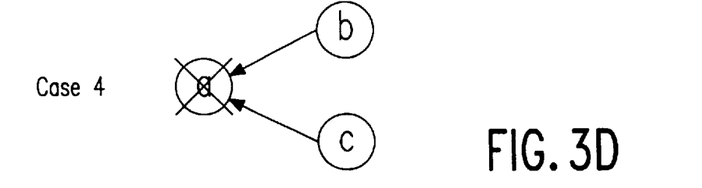

In problem detector 50, the six possible, generally negative, results of the foregoing are forwarded straightaway, like the OK signal. However, a particular sequence of results, that each separately are fully acceptable, may represent a RECURRING_PROBLEM signalization that necessitates particular action as will be discussed hereinafter. This signalization is also forwarded to the event handler processing block 46. This block outputs an appropriate system prompt 48 to the user person in the form of speech. The associated policy has been outlined with respect to FIGS. 2, 3. The prompt may be selected from a repertoire that is stored in question statement block 42, which furthermore, upon initialization of the system outputs the opening statements as well as the first question. Note that the result NOTHING_UNDERSTOOD can lead to repeating the question, or to outputting a question with an effectively identical content, but a modified form, as will be discussed.

FURTHER DESCRIPTION OF THE PROBLEM DETECTOR

At the beginning of a dialogue part, a variable is generally undefined, but certain variables may have a default initialization value. Through a user person utterance a variable can get a value, which makes the variable defined (UD). From defined, through one or more further user person statements, the variable can change to either undefined (DU) or verified (DV), or while remaining defined can have its value amended (DD), i.e. the status graph is altered. The events are not necessarily mutually exclusive. When UD or DV occur, the dialogue is progressing. Occurrence of DU, DD indicates a problem. QR (question repeated) is even worse, inasmuch it indicates an unsatisfactory progress of the dialogue as shown with respect to various examples of FIG. 2, and may even cause an endless loop. Therefore, the problem detector traces the progress of the dialogue, monitoring these events, weighting and accumulating them. In this manner, a metric for the quality of the dialogue is generated, indicating whether there are no problems, slight ones, etc. If the value of this metric exceeds a certain threshold, an event is triggered, which can be caught by an appropriate handler inside a question. The handler approach is appropriate because the metrics are only updated when a user answer is received and recognized.

Generally, the cycle of FIG. 4 can repeat an arbitrary number of times. A particular question posed leads to counting of events like NOTHING_UNDERSTOOD to allow reformulating a question. Generally, the question is relinquished in favour of another question upon this occurrence. The quality metric is split into two separate parts: a question quality metric, and a dialogue quality metric. The question quality metric has a range of four distinct values: no problems, slight problems, medium problems, major problems. Each time a question is answered, the associated question quality metric is evaluated, and next, the dialogue quality metric is changed accordingly. The first one has value range, xi indicating various thresholds):

<0: improving
<x1: no problems
<x2: slight problems
<x3: medium problems
≧x3: major problems The following table indicates the old state of the dialogue quality metric (first column), the question quality metric (first row, next five columns), and the new value of the dialogue quality metric (remaining table entries).

| Old state | Improving | No     | Slight | Medium | Major  |
|-----------|-----------|--------|--------|--------|--------|
| No        | No        | No     | Slight | Slight | Medium |
| Slight    | No        | No     | Slight | Medium | Medium |
| Medium    | No        | Slight | Medium | Major  | Major  |
| Major     | Slight    | Medium | Medium | Major  | Major  |

During a question, the question metric is incremented or decremented depending on actual events. Every event occurring due to an user answer is counted only once. For example, if two variables are changed through one answer, this is counted as if only a single change had occurred. The problem detector event is triggered depending on the question quality metric and on the dialogue quality metric. For example, if the dialogue quality metric indicates 'no problems', the event is triggered when the question quality metric surpasses ×3. If the dialogue quality metric indicates slight problems, the event is triggered at ×3, for medium problems at ×2, and for major problems at ×1.

The changes in the question quality metric can have the following default value for various events: UD gives −1, DV gives −2, DU gives +2, and DD gives +1. The value of QR is +2 for the first appearance, and +6 for all subsequent ones. Generally, each fact is connected to only a single slot, through derivation of its meaning, or context.

Subsequently, the two Table pages comprise various items featured in the dialogue. The format, although worded in a particular environment-directed language, follows conventional software techniques. The fist two lines represent a comment. Next, a class is defined for the application transaction TrainTable. The query intends to find four slot filler functions, and the result also has four slot (result) fillers that must conform to items from the data base (signalled by &: call by reference). The class telephone directory is structured in a somewhat similar manner, but first undertakes to find whether the combination of firstName and lastName is appropriate (Boolean result).

The next part of the table indicate the updating of the status graph. Herein, various contradictions have been listed. The first contradiction would be based on the fact that origin and destination of a journey have in principle to be different. Thus, a circular journey is excluded. If equal, both nodes are discarded. An update of the status graph is based on the fact that two locations are named as origin or departure, one of the two being the location where the user person actually is, and the other location being elsewhere (!="here", the exclamation sign indicating negation). In that case, the two are combined, and the 'other' location is taken as the most probable origin location of the intended journey. The third contradiction leads to the discarding of invalid dates, based on the fact that four months have 30 days, one has 28 (or 29) days, and only the remaining seven have 31 days. If inappropriate, the date is discarded. The next contradiction for the case of a telephone directory is the non-existence of a combination of first and last name. In that case, both names are discarded. Another solution is listed next, in that an external database is accessed if the internal data base (such as for a particular industry site) did not contain the intended information. Also then, the combination of the two names may be invalid.

The next-following printout relates to the control interaction with the user. The actions first indicate that the system asks the user (in German): "From where do you want to travel?": "Von wo aus möchten Sie fahren?" Three unsatisfactory outcomes are shown. First, upon NOTHING_RECORDED the system may ask: "Excuse me, I haven't heard anything". If the same problem is encountered again, the system asks: "Please say once again, wherefrom you want to travel". In the case of NOTHING_UNDERSTOOD, and the repetition metric is 1, the system asks: "Excuse me, I did not understand you. Please say once more, wherefrom you want to travel". If the repetition metric is not 1, the system asks however: "Excuse me, I still have not understood you. Please say once more, wherefrom you want to travel". In the case of RECURRING_PROBLEM, the system changes the dialogue processing. For example, it may try to find out one of the other slot filler items first, or it may change to a more simple formulation of the question.

The next following part relates to the asking of data and time of a journey. The first question, in German is "When do you want to travel?" In the case NOTHING_RECORDED, and the repetition metric is 1, the system asks: "Excuse me, I have heard nothing. Please say once more when you want to travel". If the repetition metric is equal to 2, the system asks: "Excuse me, I still have heard nothing. Please say once more when you want to travel". If the repetition metric is still higher, the system asks: "Excuse me, again I have heard nothing. Please say one further time when you want to travel". Similar procedures are followed when undertaking to extract the other informations from the user person.

What is claimed is:

1. A transaction system based on machine-based speech recognition, comprising a speech input, speech recognition means fed by said speech input, dialogue control means fed by said speech recognition means, and speech generation means fed by said dialogue control means for outputting question statements and verifier statements from a statement repertoire set, and for executing a human-machine dialogue with said system, until said dialogue control means has recognized a viable transaction formulation comprising a plurality of user-provided slot fillers for specifying said transaction, characterized in that said dialogue control means comprise with respect to a particular transaction:

status graph building means for building one or more directed and loopless status graphs with nodes that each comprise a respective one of said slot fillers and an associated verifier metric, and which nodes are interrelated through logic combinations among their respective slot fillers, and said graph building means including amending means for amending a node's metric, and discard means for under control of conflict detection or lowering of a particular node's metric, discarding the node in question, including of all nodes derived from the so discarded node, and also one-to-one derival nodes of the discarded node, problem detector means for detecting a particular subset of problems associated with a particular statement outputted by said speech generation means regarding a particular slot filler item, as combined with an associated subsequent human speech unsatisfactory recognition result, and thereupon controlling said speech generation means for outputting a subsequent question statement for ascertaining the latter slot filler.

2. A system as claimed in claim 1, wherein said subsequent question statement is of simplified structure as compared to said particular predecessor statement.

3. A transaction system as claimed in claim 1, wherein said discarding pertains also to all identical many-to-one derival nodes but excludes non-identical many-to-one derival nodes of any discarded node.

4. A transaction system as claimed in claim 1, wherein each recognized slot filler item is verified once by a directly subsequent verifier statement.

5. A transaction system as claimed in claim 1, wherein said problem detector is reactive to a score which is accumulated from a least a subset of the following events:

TOO_LOUD, TOO_QUIET, NOTHING_RECORDED, TOO_LONG, OVERLAP, NOTHING_UNDERSTOOD.

6. A transaction system as claimed in claim 1, for use as a trains timetable information system.

7. A transaction system as claimed in claim 1, for use as a telephone directory information system.

8. A method for implementing a human-machine transaction based on machine recognizing of speech, said method comprising the steps of:

receiving and recognizing human speech, controlling a dialog on the basis of said recognized speech, outputting in the form of machine speech various question statements and verifier statements from a statement repertoire set, and executing a human-machine dialog until recognizing a viable transaction formulation comprising a plurality of user-provided slot fillers for specifying said transaction, being characterized in with respect to a particular transaction, comprising the steps of:

building one or more directed and loopless status graphs with nodes that each comprise a respective one of said slot fillers and an associated verifier metric, whilst interrelating said nodes by logic combinations among their respective slot fillers, if applicable, amending said status graph as regarding a node's metric and selectively, under control of conflict detection or lowering of a particular node's metric, discarding the node in question, including of all nodes derived from the discarded node, and also one-to-one derival nodes of any discarded node, detecting a particular subset of problems associated with a particular said statement regarding a particular slot filler, as combined with an associated subsequent unsatisfactory human speech recognition result, and thereupon outputting a subsequent question statement for ascertaining the latter slot filler.

9. A method as claimed in claim 8 wherein said subsequent question statement is of simplified structure as compared to said particular predecessor statement.

10. A method as claimed in claim 8, wherein said discarding pertains also to all identical many-to-one derival nodes but excludes non-identical many-to-one derival nodes of any discarded node.

11. A method as claimed in claim 8, wherein each recognized slot filler item is verified once by a directly subsequent verifier statement.

12. A method as claimed in claim 8, wherein said problem detecting is reactive to a score which is accumulated from a least a subset of the following events:

TOO_LOUD, TOO_QUIET, NOTHING_RECORDED, TOO_LONG, OVERLAP, NOTHING_UNDERSTOOD.

13. A method as claimed in claim 8, for use as a trains timetable information system.

14. A method as claimed in claim 8, for use as a telephone directory information system.

* * * * *